United States Patent [19]
Buckwalter et al.

[11] 4,096,310
[45] Jun. 20, 1978

[54] TRANSFER SHEET

[75] Inventors: Mervin R. Buckwalter; Walter T. Bulson, both of Lancaster, Pa.

[73] Assignee: Armstrong Cork Company, Lancaster, Pa.

[21] Appl. No.: 792,896

[22] Filed: May 2, 1977

[51] Int. Cl.$^2$ .............................................. B32B 7/00
[52] U.S. Cl. ................................... 428/288; 8/2.5 A; 428/426; 428/537
[58] Field of Search ................ 162/134, 156; 428/199, 428/207, 206, 288, 409, 264, 265, 426, 537; 8/2.5 A, 2.5 R

[56] References Cited

U.S. PATENT DOCUMENTS

| | | | |
|---|---|---|---|
| 4,007,003 | 2/1977 | Bulson et al. | 8/14 |
| 4,021,591 | 5/1977 | De Vries et al. | 8/2.5 A |
| 4,058,644 | 11/1977 | De Vries et al. | 8/2.5 A |

*Primary Examiner*—James J. Bell

[57] ABSTRACT

The invention is directed to a transfer sheet for use with sublimable dye. It is used in a dry transfer printing operation. An ideal transfer sheet must have certain porosity, strength, and other structural characteristics to permit its use in a manufacturing operation wherein a continuous printing operation is carried out.

1 Claim, No Drawings

TRANSFER SHEET

BACKGROUND OF THE INVENTION

1. Field of the Invention

The invention is directed to a porous transfer sheet for use in a sublimation printing process.

2. Description of the Prior Art

The transfer sheet herein requires that it have an adequate porosity to allow a desired air flow so that the transfer sheet may be used to print carpet. The state of the art is such that most transfer sheets being used are non-porous. The known transfer printing operations require the printing of a dye on a non-porous transfer sheet, placing the sheet adjacent to a fabric, and then transferring the image from the transfer sheet to the fabric by the application of heat to the back of the transfer sheet along with the pulling of a vacuum on the opposite side of the fabric to draw the dyes from the transfer sheet to the fabric.

SUMMARY OF THE INVENTION

The invention is directed to a transfer sheet which will be printed with a sublimable dye. The sheet will have a porous construction such that it will have an air permeability over the surface of the sheet of between 40 to 300 standard cubic feet per minute per square foot at $\frac{1}{2}$ inch water. The transfer sheet will be of an indeterminable length and a width of at least 3 feet, with a tear strength of at least 100 grams. Its tensile strength will be of at least 850 psi at 450°. The sheet will be used in a continuous printing operation and must be capable of use within a temperature range of 300° to 450° F. without a loss of its structural integrity and a dimensional change of more than $\frac{1}{2}$%. Finally, the transfer sheet must be capable of releasing at least 50% of the sublimable dye printed thereon during the printing operation.

DESCRIPTION OF THE PREFERRED EMBODIMENT

The transfer sheet to be described below is particularly useful in carrying out the manufacturing process set forth in U.S. application Ser. No. 612,773 now U.S. Pat. No. 4,007,003. Herein, a transfer sheet is placed against the back of a carpet structure and air passes through the transfer sheet and carpet to move the dye from the transfer sheet to the carpet structure. The operation is a continuous operation in that the carpet and transfer sheet are continuously moving through an area whereby the dye transfer is carried out. This must be contrasted against many state of the art processes which are carried out as an intermediate process wherein a transfer sheet and fabric structure are stationary, and a heated plate comes down against the transfer sheet to vaporize the dye of the transfer sheet. A vacuum action then pulls the dye into the fabric.

The commercial requirements for a continuous process using a transfer sheet requires that the transfer material should be available in widths of at least 3 and up to 14 feet for the dyeing of carpet fabric. The transfer sheet must be strong enough to go through the continuous processing operation. The transfer sheet must be able to withstand the required operating temperatures for at least 2 minutes without the transfer sheet losing its structural integrity and having an excessive dimensional change. Also, cost must be considered in the selection of a transfer sheet. The transfer sheet must have a surface which should be relatively smooth and continuous and capable of being printed by the rotogravure printing process with an acceptable definition of 120 lines per inch. Finally, the transfer sheet should have a uniform air permeability over the surface of the sheet. The air permeability must be registered by the ASTM D-737-46 Test and should range between 50 and 300 standard cubic feet per minute per square foot.

A transfer sheet for use in the continuous process should be of a porous construction, such that it will have an air permeability over the surface of the sheet of between 40 to 300 standard cubic feet per minute per square foot at $\frac{1}{2}$ inch water. The sheet should be of an indeterminable length since it is being used in a continuous manufacturing process. It should be of a width of at least 6 feet so that it can be used to print commercially available carpet goods of that width. It should be capable of being used in widths of up to 14 feet without any loss of its structural integrity. The transfer sheet should have a tear strength of at least 100 grams both machine and across machine direction (Elmendorf Test ASTM-D689-62), and a tensile strength of at least 850 psi at 450°. The transfer sheet should be capable of use in a temperature range of 300° to 450° F. without a loss of its structural integrity and without a dimensional change of more than $\frac{1}{2}$%. Finally, the transfer sheet should be capable of releasing at least 50% of the sublimable dye printed thereon during the printing operation with the transfer sheet.

The following chart sets forth different types of materials formed in different manners as a transfer sheet. The air permeability of the different sheets is set forth and various comments are provided relative the efficiency of each of the materials. The comments generally apply to the different types of materials.

| Type | Identification | Air Permeability SCFM/Ft$^2$ at .5" $H_2O$ | Comment |
|---|---|---|---|
| Jute | 22 × 22 count - 7 oz | 295 | 1. Jute stands up well at temperature, and releases the dye well. |
| | 13 × 15 count - 9 oz | 335 | |
| | 18 × 15 count | 258 | 2. The surface is not uniform enough for printing and the through holes leave white spots on the carpet surface. |
| | 16 × 16 count - 7 oz | 277 | |
| | 20 × 20 count | 236 | 3. Cost is high (22 to 30 cents/yd$^2$). |
| | 18 × 18 Special Weave | 23 | |
| | 17 × 17 Special Weave | 112 | |
| | 19 × 19 Special Weave - 7 oz | 450 | |
| Reemay (spun-bonded polyester) | 2016 - 1.3 oz/yd$^2$ (13.9 ¢/yd$^2$) | 505 | 1. Reemay stands up well at the temperature (very slight shrinkage). |
| | 2421 - 1.8 oz/yd$^2$ (26.4 ¢/yd$^2$) | 615 | 2. The Reemay holds the dye strongly and results in reduced dye efficiency-30%. |
| | 2024 - 2.1 oz/yd$^2$ (22.9 ¢/yd$^2$) | 282 | 3. "Printability" was better than jute, but less than E-35-S61-58 Glass |

-continued

| Type | Identification | Air Permeability SCFM/Ft$^2$ at .5" $H_2O$ | Comment |
|---|---|---|---|
| | | | paper. |
| | 2416 - 1.5 oz/yd$^2$ (20 ¢/yd$^2$) | 578 | |
| | 2014 - 1 oz/yd$^2$ (11.7 ¢/yd$^2$) | 814 | |
| Cellulose | Strathmore Grade 7411-25-52 (8.5 ¢/yd$^2$) | 50 | 1. Cellulose paper had shrinkage of 1/8" over 11" length for 7411-25-53 and 1/64" over 11" for 73-25-4. |
| | Strathmore Grade 753-25-4 | 75 | 2. Good printing resolution with rotogravure printing. |
| | Haines 3783 | 347 | 1. Shrinkage was approximately 1/32" on 12" length. |
| | Haines 3018 | 217 | |
| | Haines 1808 | 390 | 2. Wrinkled slightly when printed with water-base inks. |
| | Haines 1635 | 53.7 | 3. Air permeabilities of 347 and 390 did not provide good print definition. |
| | Haines 186 Flat | 32.2 | |
| | Dexter 1148T | 20.0–40.0 | 1. Good dye release. |
| | Paper toweling with Diamond Holes in Surface | 615 | |
| Nonwoven Glass | Made by Armstrong at Ford Co. | | |
| | Number 1 E-35-S61-58 | 208 | 1. Nos. 3, 4, and 5 are heavy for practical use. |
| | Number 2 E-42-U | | |
| | Number 3 H-66-U | | |
| | Number 4 H-66-S61-84 | | 2. Nos. 4, 5, and 6 turned very brown in color and transferred color to carpet fibers. |
| | Number 5 K-42-S61-70 | | |
| | Number 6 E-27-S61-44 | | |
| | | | 3. Nos. 1 and 2 were the best materials tested, but No. 2 does not print on surface as well as E-35-S61-58 (cost - $.27/yd$^2$). |
| Woven Glass | 100% Woven Glass Warp - 39 yarn Count 300 Denier Type DE-150 Glass Yarn Warp - 28 Yarn Count 600 Denier Type DE-75 Glass Yarn | 60 | 1. Woven glass does not print well. |

The paper-type products, such as non-woven glass, should have a smooth surface and these seem to have the best capability of being printed by the rotogravure process with an acceptable definition of 120 lines per inch. Rough surface materials, such as jute, cannot be printed with suitable detail and are not recommended where printing detail is important. An air flow of lower than 10 standard cubic feet per minute per square foot could be utilized, but cannot particularly secure good transfer of the dye. Air permeability of below 40 provides a very large pressure drop through the transfer sheet and, thus, excessive energy use is required to move air through the transfer sheet. Air permeability over 300 is secured in sheets which have a very porous structure, and such sheets have a surface which is not capable of receiving fine line detail printing and, therefore, yield sharp detail on the material to be printed. The best materials for use as a transfer sheet are certain types of non-woven glass materials and certain types of cellulosic papers.

With regard to dye release (amount of free dye released from the transfer sheet), Dexter paper released 70%–90% of its dye and non-woven glass released 50%–70%.

A dimensional change at printing temperature of more than ½% will tend to blur fine line detail.

With regard to tear strength, paper at a tear strength of 53 grams machine direction (MD) and 48 grams across machine direction (AMD) and paper at 80 grams MD and 75 grams AMD tear strength did not work well. Dexter paper 1148T at 187 grams MD and 139 grams AMD tear strength worked very well. It appears that 100 grams tear strength is the best minimum workable value to use.

A certain level of tensile strength is needed so that the transfer sheet will not tear apart during processing. Tensile strength needs vary based upon machine direction and across machine direction stresses. Temperature of processing also effects tensile strengths needed. Dexter paper 1148T was successfully used in the manufacturing process of application Ser. No. 612,773, and this has a tensile strength of 850 psi AMD and 2100 psi MD at 450°, and, 5150 psi MD and 1725 psi AMD at room temperature. All other transfer sheets used exceeded 850 psi at 450° F.

What is claimed is:

1. A transfer sheet capable of being printed with a sublimable dye, said sheet being:

(a) of a porous construction such that it will have an air permeability over the surface of the sheet of between 40 to 300 standard cubic feet per minute per square foot at ½ inch water, (b) of an indeterminable length and a width of at least 3 feet with a tear strength of at least 100 grams and a tensile strength of at least 850 psi at 450°, (c) capable of use in a temperature range of 300° F. to 450° F. without a loss of its structural integrity and a dimensional change of more than ½%, and (d) capable of releasing at least 50% of the sublimable dye printed thereon during the time the transfer sheet is used in a printing operation.

* * * * *